US009143481B2

(12) United States Patent
Wood

(10) Patent No.: US 9,143,481 B2
(45) Date of Patent: Sep. 22, 2015

(54) SYSTEMS AND METHODS FOR APPLICATION-SPECIFIC ACCESS TO VIRTUAL PRIVATE NETWORKS

(71) Applicant: APPLE INC., Cupertino, CA (US)

(72) Inventor: James P. Wood, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/911,789

(22) Filed: Jun. 6, 2013

(65) Prior Publication Data
US 2014/0366081 A1 Dec. 11, 2014

(51) Int. Cl.
H04L 29/06 (2006.01)
H04L 12/46 (2006.01)

(52) U.S. Cl.
CPC ........ *H04L 63/0272* (2013.01); *H04L 12/4641* (2013.01); *H04L 63/10* (2013.01); *H04L 63/164* (2013.01)

(58) Field of Classification Search
CPC ............................ H04L 63/102; H04L 63/105
USPC .................................................. 726/3, 13–15
See application file for complete search history.

(56) References Cited

U.S. PATENT DOCUMENTS

| 6,502,135 | B1 | 12/2002 | Munger et al. |
| 6,636,898 | B1 | 10/2003 | Ludovici et al. |
| 6,789,118 | B1 * | 9/2004 | Rao ................................ 709/225 |
| 7,418,504 | B2 | 8/2008 | Larson et al. |
| 7,478,427 | B2 | 1/2009 | Mukherjee et al. |
| 7,490,151 | B2 | 2/2009 | Munger et al. |
| 7,844,718 | B2 | 11/2010 | Polcha et al. |
| 7,921,211 | B2 | 4/2011 | Larson et al. |
| 8,051,181 | B2 | 11/2011 | Larson et al. |
| 8,065,418 | B1 | 11/2011 | Abuan et al. |
| 8,095,786 | B1 | 1/2012 | Kshirsagar et al. |
| 8,127,045 | B2 | 2/2012 | Allie et al. |
| 8,166,538 | B2 | 4/2012 | Gbadegesin et al. |
| 8,208,900 | B2 | 6/2012 | Adler et al. |
| 8,407,345 | B2 | 3/2013 | Lim |
| 8,504,697 | B2 | 8/2013 | Larson et al. |
| 8,726,007 | B2 * | 5/2014 | Chandrika .................... 713/152 |
| 2006/0236370 | A1 * | 10/2006 | John et al. ........................ 726/1 |
| 2007/0234418 | A1 * | 10/2007 | Song et al. ...................... 726/15 |
| 2008/0034418 | A1 | 2/2008 | Venkatraman et al. |
| 2008/0034419 | A1 | 2/2008 | Mullick et al. |
| 2008/0126528 | A1 | 5/2008 | Takeda et al. |
| 2013/0111043 | A1 | 5/2013 | McGuire |
| 2014/0105062 | A1 * | 4/2014 | McDysan et al. ............. 370/254 |

OTHER PUBLICATIONS

Analysis of Current VPN Technologies, Berger, Thomas, IEEE 2006.*
A distributed object-based IPSec multi-tunnels concurrent architecture, Wang et al, IEEE 2011.*

* cited by examiner

*Primary Examiner* — Luu Pham
*Assistant Examiner* — Jahangir Kabir
(74) *Attorney, Agent, or Firm* — Fay Kaplun & Marcin, LLP

(57) ABSTRACT

Described herein are systems and methods utilizing application-specific access to a virtual private network ("VPN"). A method may comprise receiving, from an application executing on a device, a request for a network data flow to a private network, comparing identification information associated with the application against a set of rules stored on a memory of the device, wherein the set of rules identifies conditions for the application to be authorized to access the private network, and establishing a connection for the network data flow upon the identification information satisfying the conditions for the application to access the private network.

18 Claims, 3 Drawing Sheets

Parts received by filtering system

Parts received by filtering system

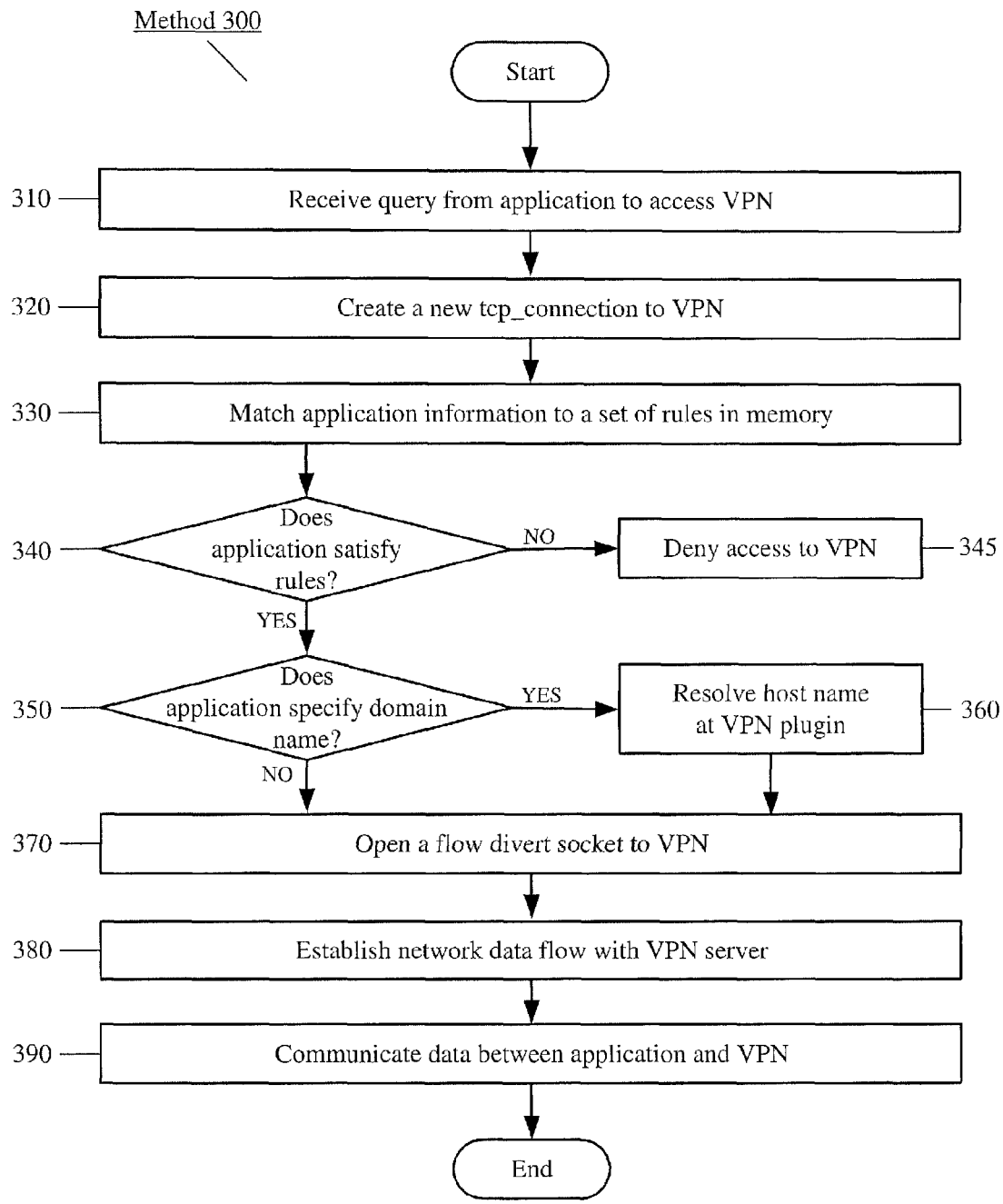

SYSTEMS AND METHODS FOR APPLICATION-SPECIFIC ACCESS TO VIRTUAL PRIVATE NETWORKS

BACKGROUND

Virtual private networks ("VPNs") provide users with a secure and restrictive private network within a public telecommunication infrastructure, such as the Internet. A VPN may allow for a host computer to send and receive data across shared and/or public networks, as if the host computer is an integral part of the private network with all the functionality, security and management policies of the private network.

The VPN connection across the Internet is technically a wide area network ("WAN") link between the sites. More specifically, a VPN may be established using virtual point-to-point connections via dedicated connections, encryption, or any combination thereof. From a user perspective, the extended network resources are accessed in the same way as resources available from the private network. To prevent disclosure of private information, VPNs typically allow only authenticated remote access and make use of encryption techniques. For instance, VPNs operate by using the shared public infrastructure while maintaining privacy through security procedures and tunneling protocols. Accordingly, by encrypting data at the sending end and decrypting it at the receiving end, these tunneling protocols send the data through a "tunnel" that cannot be "entered" by data that is not properly encrypted. An additional level of security may encrypt not only the data, but the originating and receiving network addresses, as well.

DESCRIPTION OF THE DRAWINGS

FIG. 3 shows an exemplary method utilizing application-specific access to a VPN.

DETAILED DESCRIPTION

Figure 1:
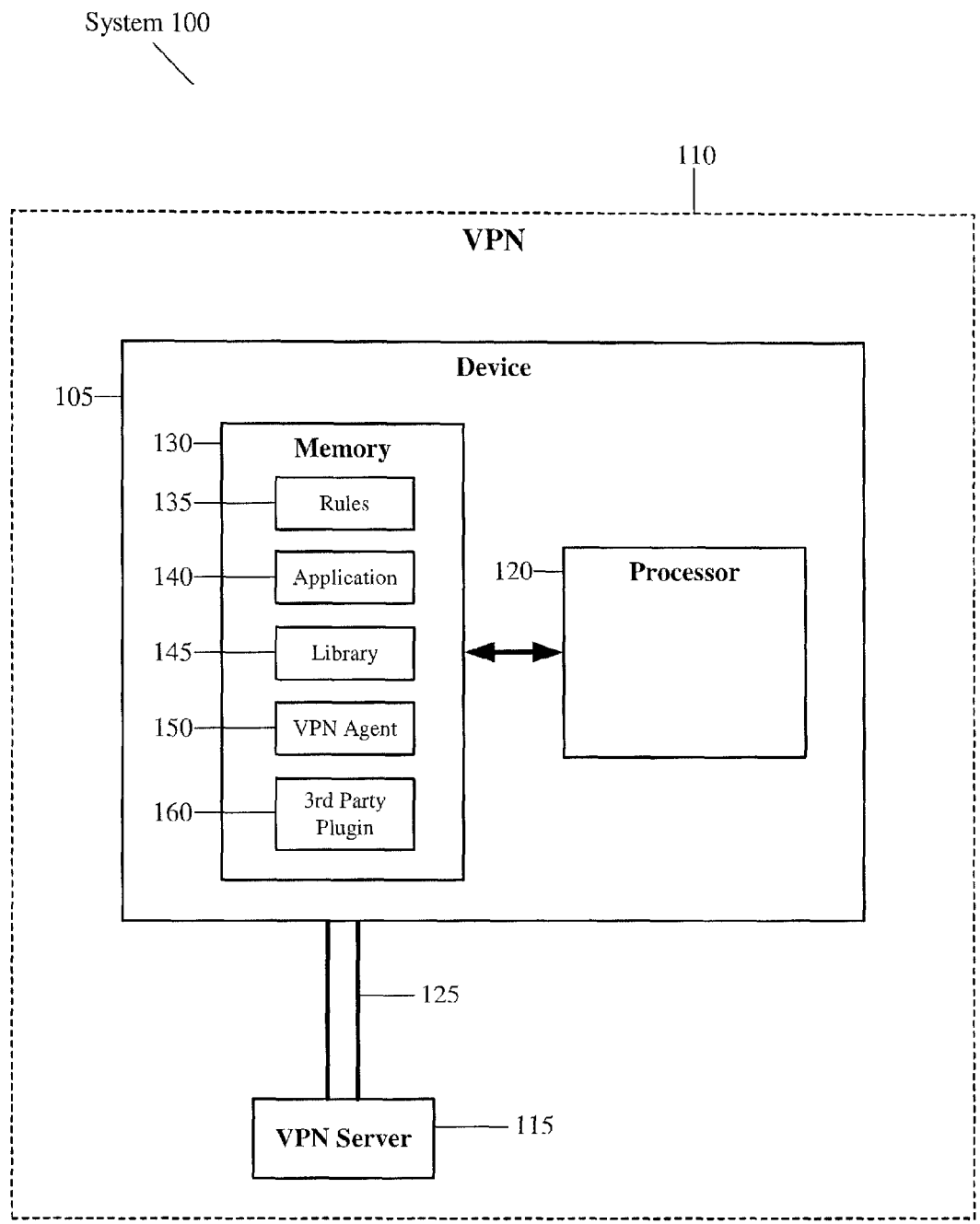
FIG. 1 shows an exemplary system utilizing application-specific access to a virtual private network ("VPN").

Described herein are systems and methods utilizing application-specific access to a virtual private network ("VPN"). A method may comprise receiving a request for a network data flow to a private network from an application executing on a device, comparing identification information associated with the application against a set of rules stored on a memory of the device, wherein the set of rules identifies conditions for the application to be authorized to access the private network, and establishing a connection for the network data flow upon the identification information satisfying the conditions for the application to access the private network Further described herein is a system comprising a memory storing a plurality of rules and a processor receiving a request for a network data flow to a private network from an application executing on a device, comparing identification information associated with the application against a set of rules stored on the device, wherein the set of rules identifies conditions for the application to be authorized to access the private network, and establishing a connection for the network data flow upon the identification information satisfying the conditions for the application to access the private network.

Further described herein is a non-transitory computer readable storage medium with an executable program stored thereon, wherein the program instructs a processor to perform the following steps: receive, from an application executing on a device, a request for a network data flow to a private network; compare identification information associated with the application against a set of rules stored on the device, wherein the set of rules identifies conditions for the application to be authorized to access the private network; and establish a connection for the network data flow upon the identification information satisfying the conditions for the application to access the private network The exemplary embodiments may be further understood with reference to the following description and the appended drawings, wherein like elements are referred to with the same reference numerals. The exemplary embodiments show systems and methods utilizing application-specific access to a VPN. In other words, as opposed to the past approaches, the exemplary embodiments described herein may allow for a VPN to establish a set of rules on the device at the application level.

Conventional VPNs use a tunneling protocol where one network protocol (e.g., the delivery protocol) encapsulates a different payload protocol. For instance, by using tunneling a system can carry a payload over an incompatible delivery network, or provide a secure path through an untrusted network. Tunneling typically contrasts with a layered protocol model such as those of Open Systems Interconnection ("OSI") or Transmission Control Protocol/Internet Protocol ("TCP/IP"). The delivery protocol may operate at a higher level in the model than does the payload protocol, or at the same level.

The conventional approach for tunneling IP packets using an IP-layer approach, wherein an IP routing table is used to decide which packets are to be tunneled. According to this conventional approach, an application writes data to a socket, the TCP/IP stack packetizes the data into IP packets, and the IP packets are routed to the tunnel. It is noted that under this approach, there is no application intelligence built into the process. In other words, all applications have access to the same IP routing table. Any application is potentially routable through an IP-layer VPN, and is only limited based on the IP address the application attempts to access.

In some conventional systems, the access limitation is on a device (e.g., the VPN access is limited to the certain devices that are registered as users of the VPN). To provide a specific example, Company X may maintain a VPN to be used by its employees. Company X may issue computing devices (e.g., desktops, laptops, tablets, notebooks, smart phones, etc.) to the employees. These devices may be registered devices with the VPN, allowing the employees to access the VPN of Company X. However, in today's world, the paradigm is shifting to a bring-your-own-device ("BYOD") model, (e.g., people want to have ownership of their own device, have access to the VPN when they do not have access to their employer-issued devices, etc.). When VPN access is limited by device, the BYOD model does not work due to the user's personal device not being a registered device with the VPN of Company X.

Accordingly, the exemplary embodiments described herein may be advantageous to such BYOD private network enterprises. This is due to the fact that the enterprise may easily control which applications may access the VPN, as opposed to controlling every device attempting access. Furthermore, the application-specific access systems and methods enable the enterprise to perform traffic inspection, as the actual application data stream is readily accessible for examination. Conventional inspection would otherwise require the enterprise to perform traditional packet inspection.

While one exemplary embodiment describes an application-specific VPN wherein specific applications are authorized to use a VPN tunnel, additional embodiments may feature any number of procedures, or a combination of procedures, for permitting access to a VPN. For instance, a further embodiment may be an application-layer VPN wherein streams of application data are tunneled to the VPN. Furthermore, the exemplary application rules described herein are not restricted in implementation to the authorization of Application-layer VPN. In other words, the exemplary application rules described herein may also be implemented to authorize specific applications to use an IP-layer VPN.

According to the systems and methods described herein, the exemplary embodiments may provide application-specific access to a VPN. Accordingly, when an application creates a network object, the library may match the application against a set of rules that dictate which applications are allowed to use the VPN tunnel. If the application matches one of these rules, the flow of network data may then be diverted through the VPN tunnel, as opposed to entering the TCP/IP stack. This application-specific VPN access is not limited to a specific device and allows an authorized VPN user to access the VPN using any device. It is noted that the VPN tunnel may be established after authenticating the user. Once established, access to the tunnel may then be restricted to applications that match the rules.

The exemplary systems and methods described herein provide control over which applications have access to the private network. The enforcement of this access may be achieved through application VPN rules. In addition, these systems and methods may eliminate data leakage from the applications that match the rules. Accordingly, applications that do not match the rules may be prevented from sending data through the VPN tunnel.

It is noted that while an exemplary embodiment may be application-based access to a private network, additional embodiments are not limited to such schemes. For instance, an account-based matching system for accessing a private network may also be used. For example, the account may include mail, contacts, and/or calendar accounts of a user's device. An exemplary account-based access system will be described in greater detail below.

Regardless of the type of matching system implemented by the exemplary embodiments (e.g., application-based, account-based, etc.), it is noted that the set of rules within the embodiments may be generated by an administrator at an entity controlling the VPN.

FIG. 1 shows an exemplary system 100 for application specific access to a VPN 110 for a device 105 executing any number of applications. The exemplary system 100 may include an electronic device 105 having a processor 120 and a memory 130, such as a non-transitory computer-readable storage medium. The device 105 may be a device such as, for example, a desktop, laptop, tablet, notebook, smart phone, etc. The system 100 may allow for an application 140 to access a VPN server 115 within the VPN 110 based on a set of rules 135 stored within the memory 130, wherein the rules 135 dictate which specific applications have access to the VPN 110.

According to the exemplary embodiments, application 140 of the device 105 may be linked to a network library 145. When the application 140 creates a new data flow, such as via a TCP connection object, the processor 120 may utilize the library 145 to match the application 140 to the set of rules 135. If the application 140 matches one of the stored rules 135, the processor 120 may divert the flow of network data through a VPN tunnel 125, as opposed to entering the TCP/IP stack. In other words, each packet of the application data may traverse a network stack (e.g., TCP/IP stack) only a single time before being communicated to the VPN 110.

In addition, the network flow data may be diverted from a socket layer to a VPN agent 150 process running in user space. Furthermore, the VPN agent 150 process may pass the network data to a third-party plugin 160 that tunnels the data over a tunnel connection to the VPN 110. It is noted that while the exemplary system 100 includes the third-party plugin 160 for tunneling data to the VPN 110, alternative embodiments may include first-party and/or integrated data transportation components for tunneling network flow data to the VPN 110.

Since the network data may not traverse the TCP/IP stack before being diverting to the VPN agent 150, the data would not be packetized and the third-party plugin 160 operating in the VPN agent 150 may have access to the stream of network data in the same, or similar, format as written by the application 140. When the third-party plugin 160 receives data from the VPN tunnel 125, the processor 120 may write the data back to a receive buffer of a socket. Accordingly, the application 140 may then be notified by the processor 120 that the data is available and may read the data from the socket. As noted above, the network data may only have to traverse the TCP/IP stack once. For example, the network data may arrive at the TCP/IP stack after being processed by the third party plugin 160, so the packets may be routed over the Internet.

According to the exemplary embodiments of the system 100, the set of rules 135 may include any number of authentication procedures for permitting the application 140 to access to the VPN 110. For instance, the rules 135 may optionally utilize a signing identifier that uniquely identifies the application 140, a designated requirement that identifies the party who signed the application 140, a list of allowed domains, or any other rules that uniquely identify an application and/or an account. Accordingly, the signing identifier and the designated requirement of the application 140 may be matched against the signature of a calling application. If the signing identifier and the designated requirement match, and there are domains present in the rules 135, then a host name of a host within the private network that the application 140 is trying to access may be suffix-matched against the list of domains. If the host matches any one of the names, or if there are no domains in the rules 135, then the application 140 satisfies the rules 135.

According to an additional embodiment of the system 100, the set of rules 135 may include account-based access procedures for authorizing the application 140 to access the VPN 110. For instance, the application 140 may be modified to "tag" the network data flow with a string identifying the account for which network access is being established. Exemplary accounts may include mail accounts, contact lists, calendar accounts, etc. The string identifying the account may then be matched against a list of account identifiers in the rules 135. In addition, a "wildcard" account may also be used, wherein every account identifier matches the wildcard account. Accordingly, if there is a match with one of the account identifiers, or if there is a wildcard account, then the account satisfies the rules 135.

Although not shown in FIG. 1, the device 105 may also include one or more network interfaces. A network interface may implement, among other functionality, the lower layers (i.e., the physical and data link layers, and/or portions thereof) in the network stack in the device 105. A network interface may be or include components such as a transceiver, a processor and/or specific-purpose DSP circuitry, and/or analog signal processing circuitry for implementing wired/wireless communications. The device 105 may include one or more network interfaces that communicate using technologies such as but not limited to: Ethernet; WiFi (IEEE 802.11a/b/g/n/ac and/or other IEEE 802.11 technologies); cellular technologies (including but not limited to LTE, LTE-A, UMTS, CDMA2000, and/or GSM-EDGE); and/or other wired and/or wireless communications technologies. In an instance where the device 105 includes a wireless network interface, the device 105 may also include an antenna (also not shown in FIG. 1) coupled to the wireless network interface. Whenever it is described in this document that the device 105 communicates data to/from the VPN server 115 and/or via the VPN tunnel 125, this communication of data may be performed using one or more of the network interfaces.

Figure 2A:
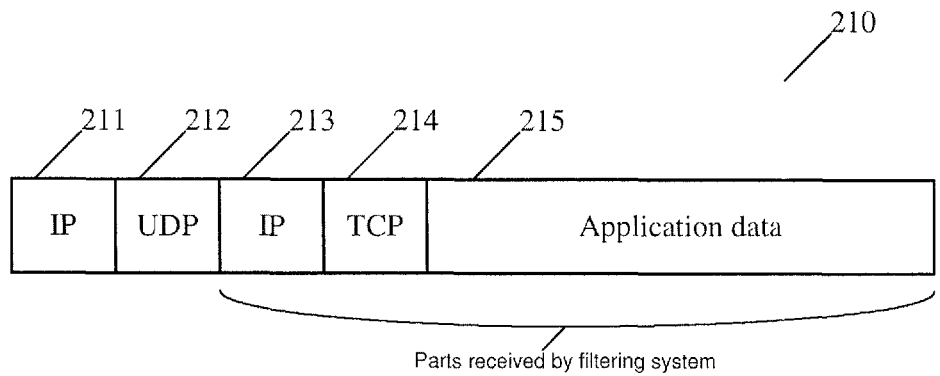
FIG. 2A shows a data packet structure for routing table access to a VPN.
Figure 2B:
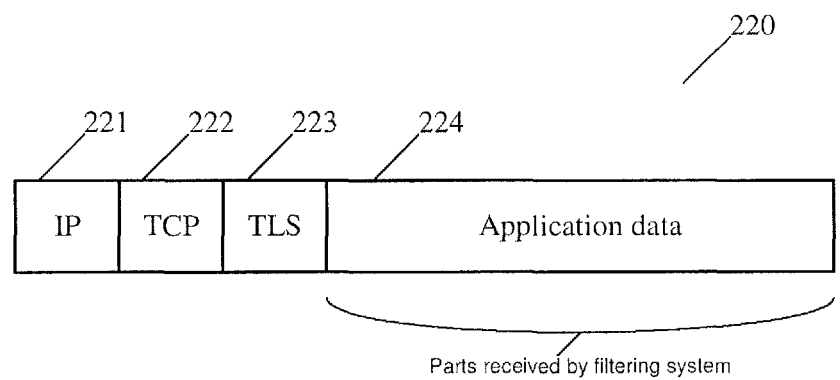
FIG. 2B shows an exemplary data packet structure for application specific access to a VPN.

FIG. 2A shows a conventional data packet structure 210 for routing table access to a VPN. FIG. 2B shows an exemplary data packet structure 220 for application-specific access to a VPN.

As illustrated in the conventional data packet structure 210, the structure 210 includes an IP header 211 having a source IP address and a destination IP address, a User Datagram Protocol ("UDP") header 212 have a source port and a destination port, a further IP header 213, a TCP header 214 having a source port and a destination port, and the payload of application data 215. Those skilled in the art would understand that both the UDP header 212 and the TCP header 213 both reside within the TCP/IP stack (e.g., transport layer) of the IP suite.

In contrast to the conventional data packet structure 210, the exemplary structure 220 includes an IP header 221, a TCP header 222, a transport layer security ("TLS") header 223, and the payload of application data 224. As noted above, the flow of this exemplary network data may be diverted through the VPN tunnel, as opposed to entering the TCP/IP stack. Accordingly, the exemplary structure 220 may not require the UDP header and IP header of transport layer segments.

As noted above, the exemplary structure 220 of the application-specific access to the VPN allows for improved traffic inspection within the network. Specifically, the traffic may be easier to monitor since data is not wrapped in the IP/UDP layer. As opposed to traditional packet inspection of the conventional data packet structure 210, the exemplary systems and methods described herein allow, in some instances, for the inspection of the actual application data stream. It is noted that any filtering software running within the VPN agent 150 process or the VPN server 115 may receive the application data wrapped in the IP and TCP headers, while not including the IP UDP headers. The IP and UDP headers will have been stripped off by the TCP/IP stack before the packet is delivered to the filtering system. Accordingly, of the parts of the packets the filtering system will receive from the TCP/IP stack, the filter would receive the IP header 213, the TCP header 214, and the applications data 215 for the conventional data packet structure 210. Alternatively, for the exemplary structure 220, the filter would receive the applications data 224.

FIG. 3 shows an exemplary method 300 utilizing application-specific access to the VPN 110. Specifically, the method 300 is a overview of the network data flow including the application 140 starting up, setting up the VPN tunnel 125, and communicating data between the application 140 and the VPN server 115 of the VPN 110. The step performed by the method 300 will be described in reference to the exemplary system 100 and its components described above with reference to FIG. 1. In addition, it is noted that each of the steps of method 300 may be performed by an AppTunnel framework, including the VPN agent 150 and the processor 120, which may be a physical hardware processing component of the system 100.

In step 310, the processor 120 may receive a query from the application 140 to connect with a destination host over the VPN HO via the VPN tunnel 125. For instance, this query may be a domain name system ("DNS") query to access a specific identification string (e.g., HTTP request) on the network.

In step 320, the processor 120 may create a network object, such as a TCP connection object, from the application 140. The network object may be used to establish a new network data flow between the application 140 and the exemplary VPN 110.

In step 330, the processor 120 may match the network object against the set of rules 135 stored in the memory 130 of the system 100. For instance, the processor 120 may obtain a process identifier ("PID/ID") of the application 140 as well as a destination host for the application 140. Accordingly, the processor 120 may perform a look-up for the PID/IP of the application 140 and the destination host within the rules 135.

In step 340, the processor 120 may determine whether the application 140 satisfies the rules 135. If the tunneling rules 135 dictate that the network data flow may be tunneled to the VPN 110, then the method 300 may advance to step 350. However, if the application 140 fails to satisfy the rules 135, the application 140 may be denied access to the VPN 110 in step 345.

In step 350, the processor 120 may determine whether the application 140 specifies a destination host by name. If the application 140 specifies the destination, then the method 300 may advance to step 360. However, if the application 140 does not name a host destination, the application 140 may bypass the DNS resolution, and the method may advance to step 370.

In step 360, the processor 120 sends the host name to the third party plugin 160 of the VPN agent 150 for resolution and, the third party plugin 160 may resolve the host name and send the results to the processor 120. Those skilled in the art would understand that host name resolution allows for successfully mapping the host name to an IP address, wherein the host name is an alias assigned to an IP node to identify it as a TCP/IP host.

In step 370, the processor 120 may open a flow divert socket of a kernel to the VPN server 115. For instance, the processor 120 may open the socket to the destination host and the TCP connection object may set a socket option indicating that network flow data should be tunneled to the VPN server 115. As opposed to having the TCP connection object set a socket option, the processor 120 may alternatively, set a rule in the socket filter indicating that a particular PID/ID and host combination should be allowed to tunnel via the VPN server 110.

In step 380, the processor 120 may establish a network data flow with the VPN server 115. In other words, upon receiving data from the application 140 on the socket, the socket filter in the kernel may send the data to the third party plugin 160 for tunneling.

In step 390, the processor 120 may communicate data between the VPN 110 and the application 140 via the VPN tunnel 125. When the third party plugin 160 receives data from the tunnel destined for the application 140, the third party plugin 160 may send the data to the socket filter of the kernel. The socket filter may place the data in the receive buffer of the socket, and the application 140 may then read the data from the socket.

It is noted that signing identifiers, designated requirements, account identifications and host name matching are only examples of any number of rules that may be used to uniquely identify the application and/or other characteristics for VPN access. Accordingly, alternative rules for identifying applications may be performed during the method 300.

The above-described exemplary embodiments provide application-specific access to a private network that does not require the use of the TCP/IP layer. Specifically, network data originating from certain applications may be routed through the VPN tunnel, while all other traffic may be routed outside the VPN. It is noted that application-specific routing may, in some instances allow for sockets of a kernel to be mapped to application identifiers of the application that opened it.

As noted above, a lookup may be performed on the application identifiers based on a set of rules for VPN access. If the lookup satisfies the rules, a network interface may be obtained and a routing socket option is set on the socket. Accordingly, all traffic generated by the socket may be routed to the specified network interface.

The above-described exemplary embodiments may be implemented in any number of enforcement procedures to ensure that only the applications that satisfy the set of rules may be allowed to use the exemplary VPN. For instance, in a "whitelist" procedure, wherein specific applications may be routed to the VPN 110, enforcement may be achieved by not installing any routes to the VPN tunnel 125 in the rules 135. Access to the VPN 110 may then be limited to a set of applications in the whitelist. Alternatively, in a "blacklist" procedure, wherein specific applications may not be routed to the VPN 110, enforcement may ensure that sockets used by these applications are not routed through the VPN tunnel 125. In other words, these blacklist applications may not be scoped to the VPN interface even if explicitly scoped via a socket option.

A further enforcement embodiment may be to enhance the filtering of traffic (e.g., PacketFilter) to support rules based on application identifiers. In addition, this embodiment may also serve as a replacement implementation for application firewalling.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
generating, by an application executing on a device, a request for a network data flow to a private network;
comparing identification information associated with the application against a set of rules stored on the memory, wherein the set of rules identifies conditions for the application to be authorized to access the private network;
diverting the network data flow to a virtual private network (VPN) tunnel as opposed to entering a Transport Connection Protocol (TCP)/Internet Protocol (IP) stack;
determining if the application specifies a destination by hostname;
resolving the hostname for the destination at VPN plugin in response to the application specified hostname;
opening a flow divert socket for application data to flow between the application and a data transportation component of the device in response to the application not specifying the destination by hostname or after successfully resolving the hostname for the destination host;
establishing a connection for the network data flow upon the identification information satisfying the identified conditions for the application to access the private network; and
directing, by the data transportation component, the network data flow directly to the private network.

2. The method of claim 1, further comprising:
communicating application data between the private network and the application over the connection.

3. The method of claim 1, further comprising:
receiving a destination host name from the application;
providing the destination host name to a data transportation component; and
resolving the destination host name at the data transportation component based on the set of rules.

4. The method of claim 1, wherein the set of rules includes one of a signing identifier identifying the application allowed to access the private network and a designated requirements identifying the application allowed to access the private network.

5. The method of claim 1, wherein the flow divert socket involves a socket filter that places the network flow data in a receive buffer accessible to the application.

6. The method of claim 1, wherein the connection involves a TCP connection object that sets a socket option indicating that the network flow data will be tunneled over the connection.

7. The method of claim 2, wherein each packet of the application data traverses a network stack only a single time before being communicated to the private network.

8. A device, comprising:
a memory storing a plurality of rules; and
a processor coupled to the memory and configured to:
receive a request for a network data flow to a private network from an application executing on the device;
compare identification information associated with the application against a set of rules of the plurality of rules stored on the device, wherein the set of rules identifies conditions for the application to be authorized to access the private network;
divert the network data flow to a virtual private network (VPN) tunnel as opposed to enter a Transport Connection Protocol (TCP)/Internet Protocol (IP) stack;
determine if the application specifies a destination by hostname;
resolve the hostname for the destination at VPN plugin in response to the application specified hostname;
open a flow divert socket for application data to flow between the application and a data transportation component of the device in response to the application not specifying the destination by hostname or after successfully resolving the hostname for the destination host;
establish a connection for the network data flow upon the identification information satisfying the identified conditions for the application to access the private network; and
direct, by the data transportation component, the network data flow directly to the private network.

9. The device of claim 8, wherein the processor is further configured to perform:
communicating application data between the private network and the application over the connection.

10. The device of claim 8, wherein the processor is further configured to perform:
  receiving a destination host name from the application;
  providing the destination host name to a data transportation component; and
  resolving the destination host name at the data transportation component based on the set of rules.

11. The device of claim 8, wherein the set of rules includes one of a signing identifier identifying the application allowed to access the private network and a designated requirements identifying the application allowed to access the private network.

12. The device of claim 8, wherein the flow divert socket includes a socket filter placing the network flow data in a receive buffer accessible to the application.

13. The device of claim 8, wherein the connection is a TCP connection object that sets a socket option indicating that the network flow data will be tunneled over the connection.

14. The device of claim 9, wherein each packet of the application data traverses a network stack only a single time before being communicated to the private network.

15. A non-transitory computer readable storage medium with an executable program stored thereon and executed by a processor to cause the processor to perform a set of actions, the actions comprising:
  receiving, from an application executing on a device, a request for a network data flow to a private network;
  comparing identification information associated with the application against a set of rules stored on the memory, wherein the set of rules identifies conditions for the application to be authorized to access the private network;
  diverting the network data flow to a virtual private network (VPN) tunnel as opposed to entering a Transport Connection Protocol (TCP)/Internet Protocol (IP) stack;
  determining if the application specifies a destination by hostname;
  resolving the hostname for the destination at VPN plugin in response to the application specified hostname;
  opening a flow divert socket for application data to flow between the application and a data transportation component of the device in response to the application not specifying the destination by hostname or after successfully resolving the hostname for the destination host;
  establishing a connection for the network data flow upon the identification information satisfying the identified conditions for the application to access the private network; and
  directing, by the data transportation component, the network data flow directly to the private network.

16. The non-transitory computer readable storage medium of claim 15, wherein the actions further include:
  communicating application data between the private network and the application over the connection.

17. The non-transitory computer readable storage medium of claim 15, wherein the actions further include:
  receiving a destination host name from the application;
  providing the destination host name to a data transportation component; and
  resolving the destination host name at the data transportation component based on the set of rules.

18. The non-transitory computer readable storage medium of claim 16, wherein each packet of the application data traverses a network stack only a single time before being communicated to the private network.

* * * * *